Nov. 25, 1924.
F. E. McCARRON
FOOD CONTAINER
Filed May 14, 1923
1,516,775
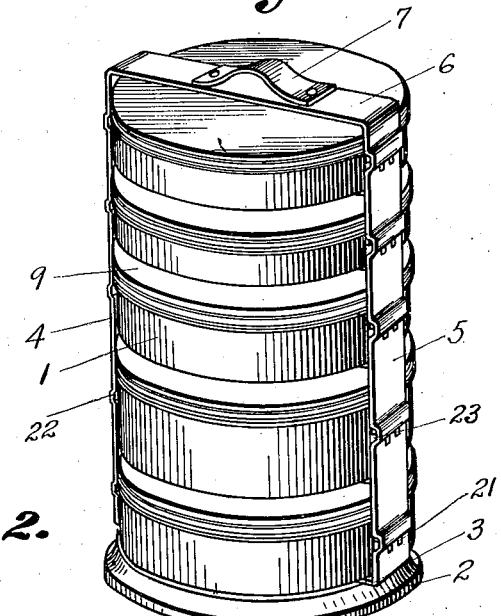
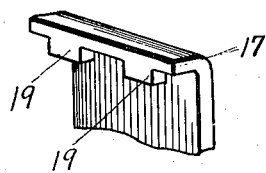
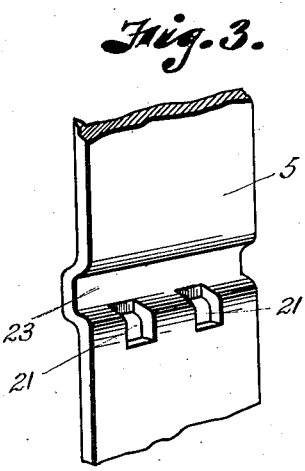
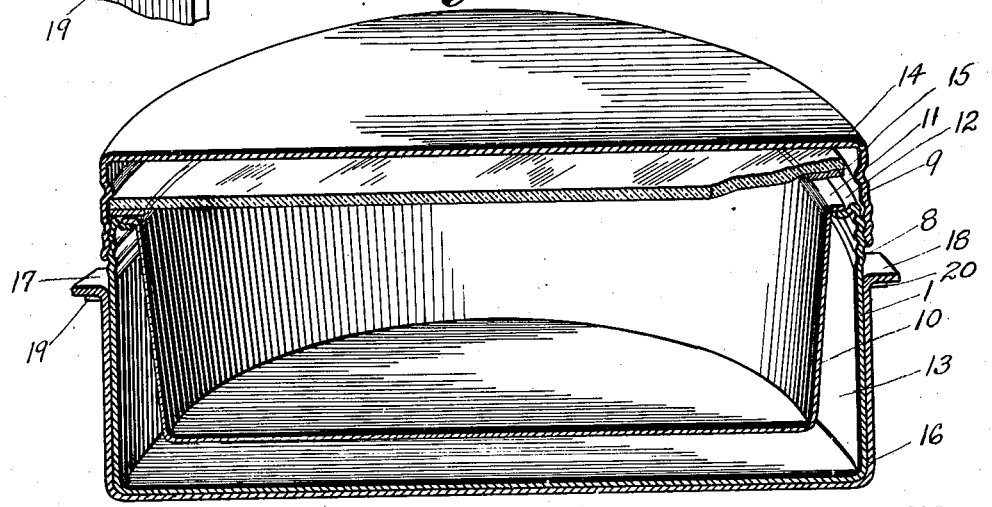
INVENTOR
Frances E. McCarron.
BY
ATTORNEY Patented Nov. 25, 1924.

1,516,775

UNITED STATES PATENT OFFICE.

FRANCES E. McCARRON, OF KANSAS CITY, MISSOURI.

FOOD CONTAINER.

Application filed May 14, 1923. Serial No. 638,809.

*To all whom it may concern:*

Be it known that I, FRANCES E. McCARRON, a citizen of the United States, residing at Kansas City, in the county of Jackson and State of Missouri, have invented certain new and useful Improvements in Food Containers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a food container and the primary object of the invention is to provide a compartmental container adapted to receive food and maintain it at the proper temperature for longer periods than would ordinarily be possible if the food were exposed to atmosphere.

The invention is particularly designed for use in hotels. As is well understood it is not uncommon to serve meals in the rooms of the hotels. Not infrequently the food becomes cold between the time it leaves the kitchen and the time it is served or if it is originally in a cold state, its temperature will rise to the detriment of the food.

This invention contemplates the provision of means whereby the food may be maintained in its original state for definite periods and particularly for such lengths of time as is necessary to serve it after it has been prepared. Such a device must essentially be simple in construction and easy to handle and I have, therefore, provided a compartmental container consisting of a plurality of units, each adapted to contain food, the units being so constructed that they can be stacked one upon the other and supported in a carrier so that the complete container can be conveniently transported.

The novel construction of the invention will be clearly apparent by reference to the following description in connection with the accompanying drawings, in which—

Fig. 1 is a perspective view of a food container constructed in accordance with my invention.

Fig. 2 is an enlarged perspective view of one end of a bracket carried by a unit.

Fig. 3 is a fragmentary perspective view of the carrier, and

Fig. 4 is a perspective, sectional view through one unit.

The container may consist of a plurality of units secured together by a carrier. Each unit is shown as comprising an outer casing 1, the lowermost container having a base 2 to which is fastened a carrier in the form of a loop consisting of the bottom bar 3, the side bars 4 and 5 and the top bar 6, the top bar being provided with a handle 7. The bottom bar 3 is secured to the base in any well known manner by brazing, welding or riveting. The particular method for securing the bottom bar is immaterial. The top portion of each container is shown as being threaded as at 8 to receive a threaded cover 9, the cover 9 obviously being removable.

Spaced within the casing 1 is a pan or inner container 10 having a peripheral flange 11 resting upon an inturned flange 12 at the top of the casing 1, the flanges 11 and 12 being preferably secured together by welding or soldering so that there will be a hermetically sealed insulation space 13 between the inner and outer containers. The flanges 11 and 12 together form a shelf to receive an inner cover 14 and there is a packing strip 15 to support the cover 14.

Each container carries a bracket member 16 having outturned ends 17 and 18 with depending lugs 19 and 20 to be received in the slots 21 in the side bars 4 and 5 of the carrier. Above the slots in the side bars are transverse, offset grooved portions 22 and 23, the widths of the grooves being sufficient to permit the flanges 17 and 18 and the lugs 19 to be slid laterally therein until the lugs 19 and 20 register with the slots 21 to lock the units in position, as shown in Fig. 1. The slots are preferably so distanced that there will be spaces between the units.

When the food is prepared, the covers 9 and 14 are removed, the food is placed in the inner containers 10, the covers are put back in place, and the containers are then moved into the carriers one upon the other until the device is completed, as shown in Fig. 1. Then the associated members can be conveniently carried to the room, the units can be removed and opened and the food served in a convenient manner and without appreciable variation in temperature from that at which the food was originally placed in the containers. By hermetically sealing the space 13, the food is protected from outside atmosphere.

In some cases I may find it unnecessary to actually seal the joint between the inner and outer containers but I prefer this method as it insures a better insulation space.

What I claim and desire to secure by Letters-Patent is:

A food container comprising a carrier consisting of a base, a vertical frame on the base having horizontal grooves with openings in the bottom edges of the grooves and a plurality of individual food receptacles, each having brackets with out-turned ends provided with lugs to engage the openings in the edges of the grooves whereby the receptacles can be stacked one upon the other and secure the frame against sidewise movement.

In testimony whereof I affix my signature.

FRANCES E. McCARRON.